(12) United States Patent
Park et al.

(10) Patent No.: US 8,057,065 B2
(45) Date of Patent: Nov. 15, 2011

(54) LIQUID CRYSTAL DISPLAY

(75) Inventors: Jung-Hong Park, Daegu (KR); Woo-Jin Kim, Paju (KR)

(73) Assignee: LG Display Co., Ltd., Seoul (KR)

( * ) Notice: Subject to any disclaimer, the term of this patent is extended or adjusted under 35 U.S.C. 154(b) by 651 days.

(21) Appl. No.: 12/195,506

(22) Filed: Aug. 21, 2008

(65) Prior Publication Data

US 2009/0051635 A1 Feb. 26, 2009

(30) Foreign Application Priority Data

Aug. 21, 2007 (KR) .......................... 10-2007-0084059

(51) Int. Cl.
*F21V 29/00* (2006.01)
*F21V 19/00* (2006.01)

(52) U.S. Cl. .................. 362/218; 362/97.2; 362/217.16; 362/217.17; 362/225

(58) Field of Classification Search .................. 362/97.1, 362/97.2, 249.02, 225, 217.14, 217.16, 217.17, 362/218, 294, 373; 349/61, 63, 70
See application file for complete search history.

(56) References Cited

U.S. PATENT DOCUMENTS

| 7,165,862 | B2 * | 1/2007 | Wu .............................. 362/218 |
| 7,607,791 | B2 * | 10/2009 | Yoo et al. ..................... 362/97.2 |
| 7,722,242 | B2 * | 5/2010 | Chen et al. .................... 362/634 |

* cited by examiner

*Primary Examiner* — Thomas Sember
(74) *Attorney, Agent, or Firm* — Brinks Hofer Gilson & Lione

(57) ABSTRACT

A liquid crystal display includes: a liquid crystal panel; a plurality of lamps supplying light to the liquid crystal panel; external electrodes provided at both ends of the lamps; common electrodes including a plurality of electrode holders for fixing the external electrodes of the lamps in a surrounding manner and supplying power to the lamps; a first support side disposed on the external electrodes provided at the plurality of lamps and the common electrodes; and a common electrode support extending from the first support side to support the common electrodes and having a heat circulation passage.

6 Claims, 6 Drawing Sheets

LIQUID CRYSTAL DISPLAY

RELATED APPLICATIONS

This application claims the benefit of the Korean Patent Application No. Aug. 21, 2007, filed on, which is hereby incorporated by reference as if fully set forth herein.

BACKGROUND OF THE INVENTION

1. Field of the Invention

The present invention relates to a liquid crystal display and, more particularly, to a liquid crystal display capable of minimizing noise by preventing deformation of a common electrode made of a metal material and an external electrode of a lamp.

2. Description of the Related Art

In general, currently, the applications for a liquid crystal display (LCD) are growing due to its characteristics that it is lighter, thinner, and driven at a low power consumption. Thus, the LCD is being commonly applied to mobile computers such as notebook computer, office automation equipment, audio/video equipment, or the like.

The LCD displays a desired image on its screen by controlling the amount of transmission of light according to a video signal applied to a plurality of control switch elements arranged in a matrix form.

The LCD includes a liquid crystal panel including a color filter substrate, an upper substrate, and a thin film transistor (TFT) substrate, a lower substrate, and a liquid crystal layer filled therebetween, and a driver that supplies a scan signal and image information to the liquid crystal panel to operate the liquid crystal panel Compared with a CRT (Cathode Ray Tube) or an LED (Light Emitting Diode), the LCD is not a self-emissive display device and thus does not emit by itself, so it requires a backlight assembly for providing light to the liquid crystal panel.

Light sources for generating light in the backlight assembly include a CCFL (Cold Cathode Fluorescent lamp), an EEFL (External Electrode Fluorescent Lamp), the LED, or the like.

In general, the CCFL has been commonly used as a light source of the LCD, but the use of the CCFL has many problems. First, because an inverter needs to be connected to each CCFL in a one-to-one manner, there is a limitation in reducing the size of the LCD and making the LCD thinner. Second, the fabrication costs increase. Third, the luminance of each lamp varies according to an output voltage and frequency of a transformer installed at an output terminal of each inverter, so the luminance of a displayed screen image is not uniform.

Thus, recently, the EEFL is increasingly employed as the light source for the LCD, and research for the EEFL is actively ongoing.

The EEFL has such a structure that an electric field is formed in a glass tube via an external electrode formed on an external wall surface of both ends of the lamp to discharge a gas within the lamp. Compared with the CCFL, the EEFL can have a relatively long life span and obtain the uniform luminance because a plurality of external electrode fluorescent lamps can be connected in parallel through a single inverter.

The structure of the general LCD having the EEFL as a light source will now be described with reference to FIGS. 1 to 4b.

With reference to FIG. 1, the general LCD includes a liquid crystal panel 1 for displaying an image, a backlight assembly that supplies light to the liquid crystal panel 1, and an upper cover 7 and a lower cover 8 for receiving and fixing the liquid crystal panel 1 and the backlight assembly therein.

The backlight assembly includes lamps 2 that emit light, an optical sheet 9 positioned at an upper potion of the lamps 2 to increase light efficiency, first support sides 4 positioned at upper portions of both ends of the lamps 2, and second support sides 5 positioned at lower portions of both ends of the lamps 2.

Each lamp 2 includes a glass tube 2a in which phosphor is coated on an inner wall to emit light, and an external electrode 2b provided at both ends of the glass tube 2a.

In the general LCD, common electrodes 3 are mounted on the second support sides 5 to supply power to the external electrodes 2b of the lamps 2. The common electrodes 3 includes an electrode holder 3a contacting with the external electrodes 2b of the lamps 2 in a surrounding manner to fix the lamps 2 and supplying power to the lamps 2 and common units 3b having a two-bar shape and connected with both ends of the electrode holders 3a. Power supplied to the common electrodes 3 from the exterior is applied to the external electrodes 2b of the lamps 2 through the electrode holders 3a to form an electric field in the lamps 2, to thus allow the lamps 2 to emit light.

As shown in FIG. 2, a plurality of common electrode supports 4a are provided on the first support sides 4. The plurality of common electrode supports 4a extend from an inner surface to come in contact with the common electrodes 3 to support and fix the common electrodes 3. The common electrode supports 4a are formed such that they have a width similar to the width of the lamps 2 of the first support sides 4 in a lengthwise direction so as to be in contact with the common units 3b having the two-bar shape at one time.

With reference to FIG. 3, the general LCD having such a configuration as described above has the following problem. Because the common electrode supports 4a serve as barriers barring between the lamps 2, heat generated from the lamps 2 is not circulated but kept in the narrow space, the temperature in the first and second support sides 4 and 5 goes up sharply when driven. Then, the common electrodes 3 made of a metal material and the external electrodes 2b of the lamps 3 expand according to the temperature increase, to frictionally contact with the first and second support sides 5 and 5 made of a plastic material to generate noise.

In addition, after the LCD is driven for a certain time period, when power is cut off, the common electrodes 3 and the external electrodes 2b of the lamps 2, which have been expanded by heat during the driving operation, are contracted to frictionally contact with the first and second support sides 4 and 5 to generate noise.

The problem will now be described in detail with reference to FIGS. 4a and 4b.

FIG. 4a is a graph showing changes in the strength of noise according to the lapse of time based on a driving start time of the related art LCD as a reference, and FIG. 4b is a graph showing changes in the strength of noise according to the lapse of time based on a power cutoff time of the related art LCD as a reference after the LCD is driven for a certain time period.

With reference to FIG. 4a, when the related art LCD was operated (or driven), the detected noise level has a maximum value of about 39.5 [dB], which is a value that was measured at 481 seconds after the start of operation. Also, referring to FIG. 4b, when the power of the related art LCD was cut off after the LCD operated for a certain duration, the detected noise level has a maximum value of about 34.5 [dB], which is a value that was measured at 133 seconds after power cut off.

Thus, because the related art LCD generates the noise 39.5 [dB] and 34.5 [dB], which are sufficient to make the user uncomfortable, the user would feel stressed in using the related art LCD.

SUMMARY OF THE INVENTION

This specification provides a liquid crystal display including: a liquid crystal panel; a plurality of lamps supplying light to the liquid crystal panel; external electrodes provided at both ends of the lamps; common electrodes including a plurality of electrode holders for fixing the external electrodes of the lamps in a surrounding manner and supplying power to the lamps; a first support side disposed on the external electrodes provided at the plurality of lamps and the common electrodes; and a common electrode support extending from the first support side to support the common electrodes and having a heat circulation passage.

The foregoing and other objects, features, aspects and advantages of the present invention will become more apparent from the following detailed description of the present invention when taken in conjunction with the accompanying drawings.

DETAILED DESCRIPTION OF THE INVENTION

A liquid crystal display according to exemplary embodiments of the present invention will now be described with reference to the accompanying drawings.

Figure 1:
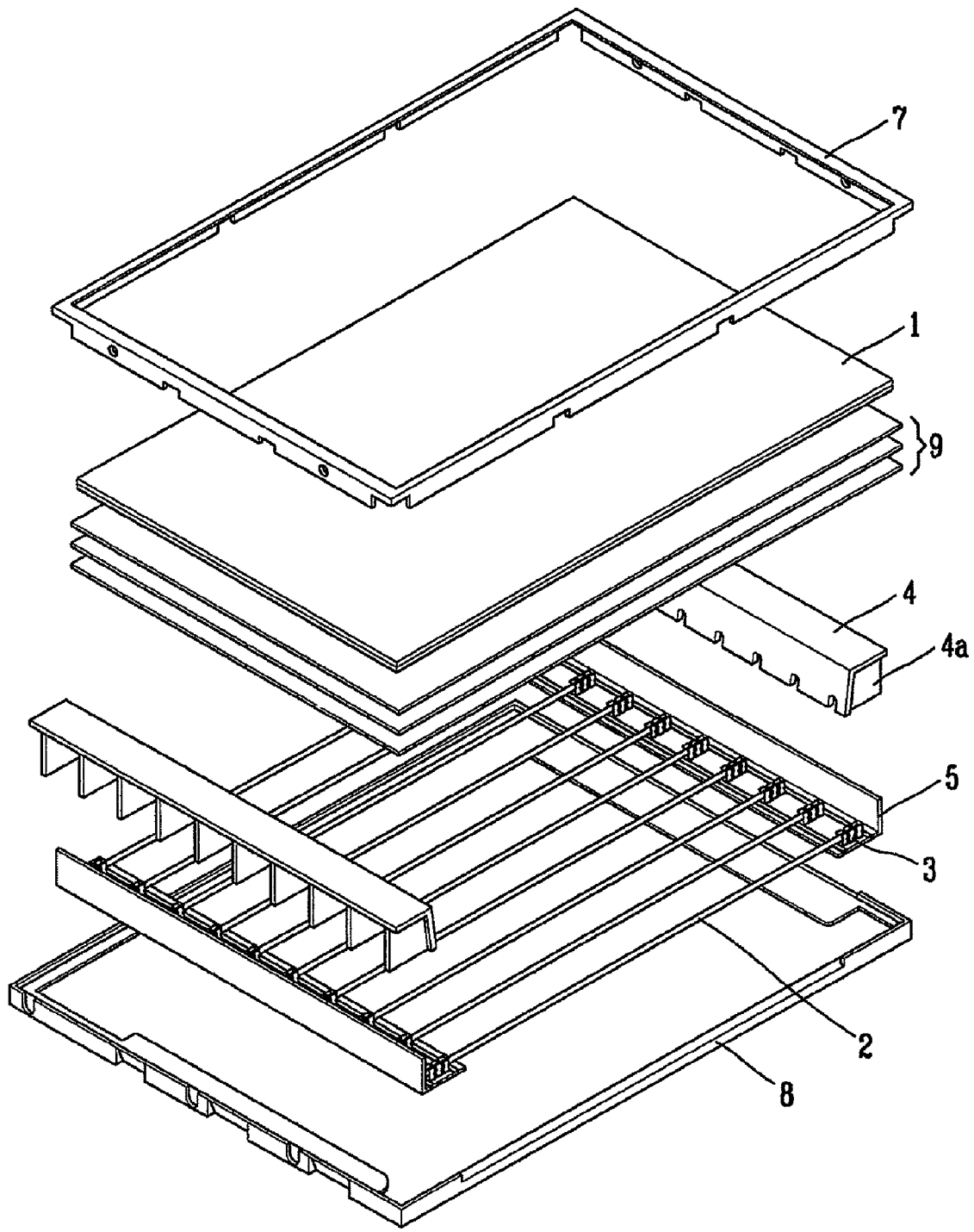
FIG. 1 is an exploded perspective view showing a general liquid crystal display (LCD)
Figure 2:
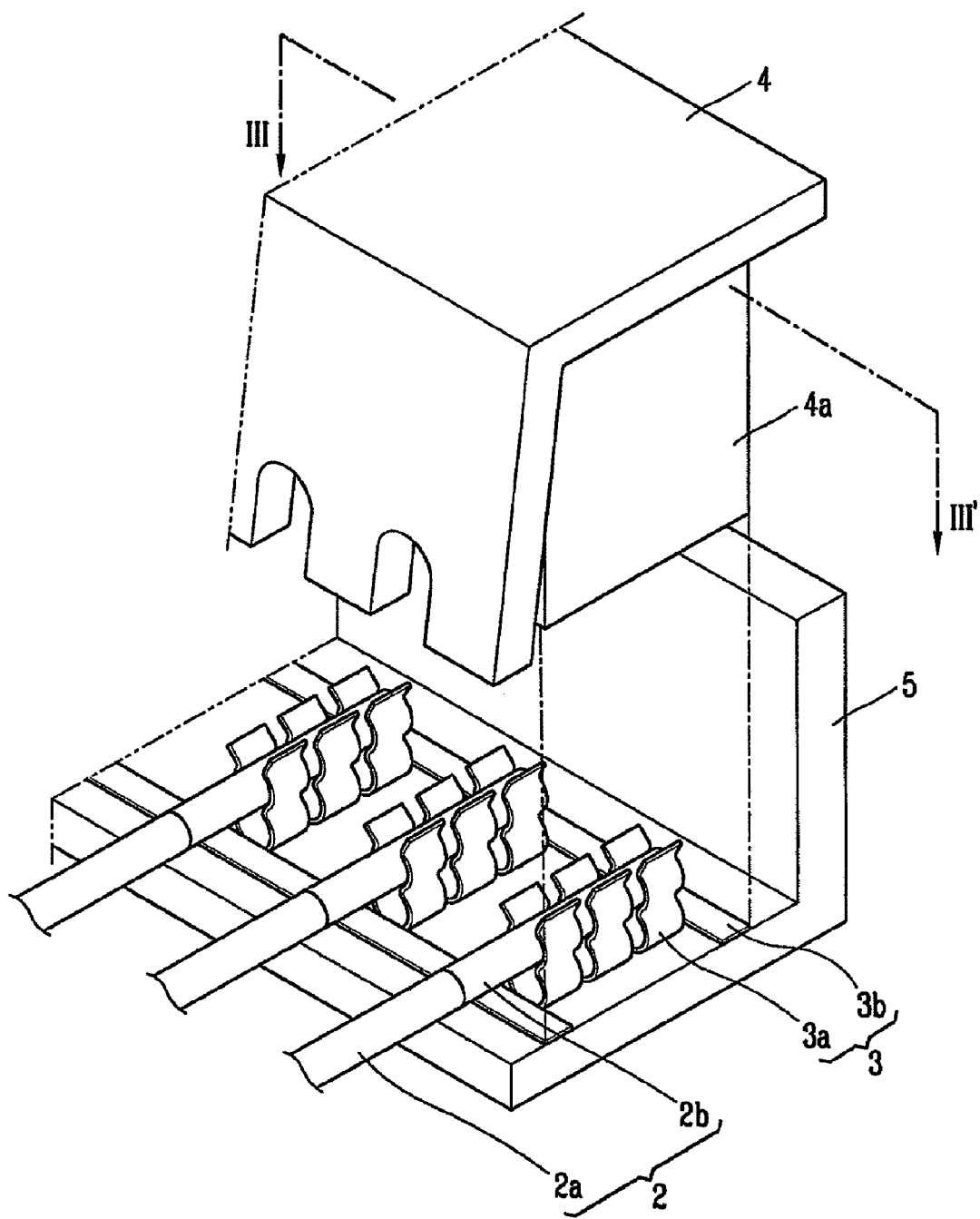
FIG. 2 is an exploded perspective view showing a portion of the LCD in FIG. 1.
Figure 3:
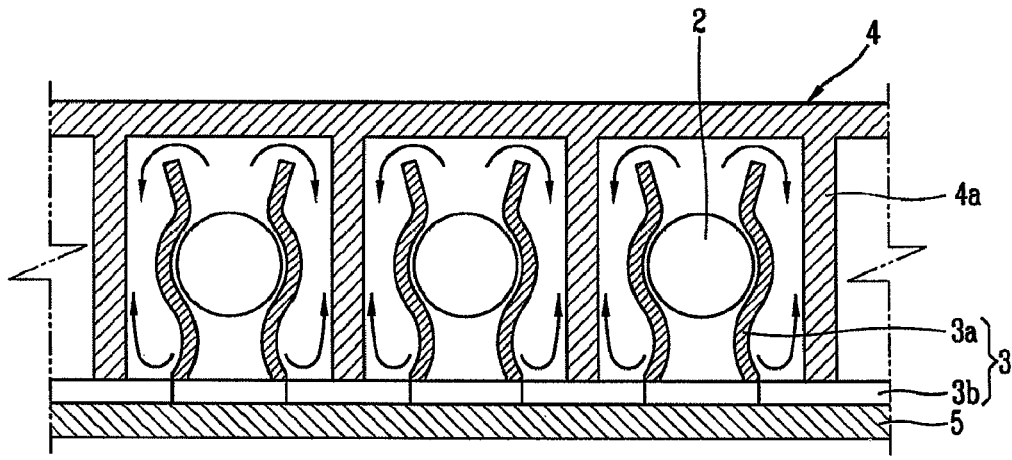
FIG. 3 is a sectional view taken along line III-III' in FIG. 2, showing a combined state of first support sides, lamps and common electrodes.
Figure 5:
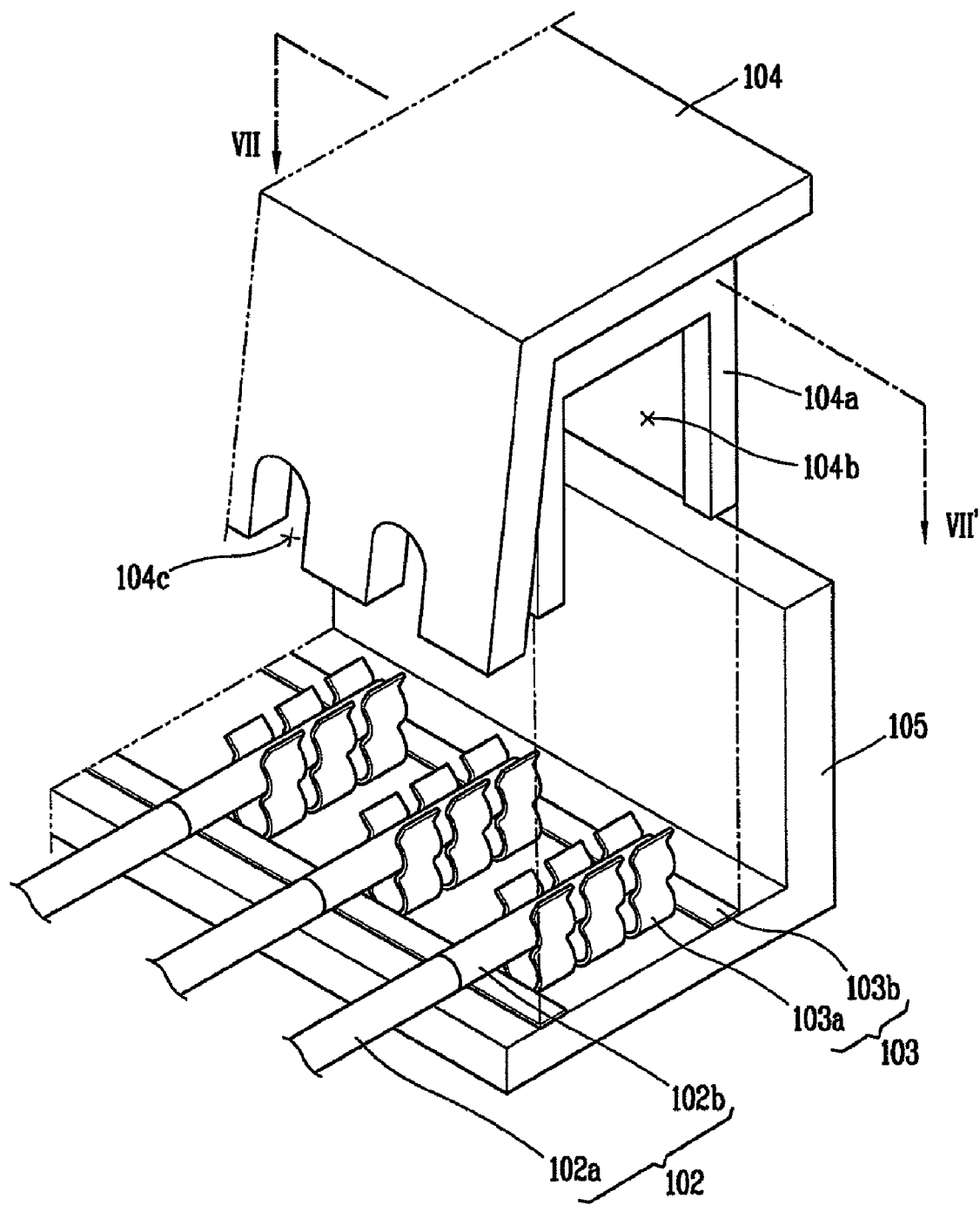
FIG. 5 is an exploded perspective view sowing an LCD according to an embodiment of the present invention.

As shown in FIG. 5, the liquid crystal display (LCD) according to an exemplary embodiment of the present invention includes: a liquid crystal panel (See 1 in FIG. 1); a plurality of lamps 102 supplying light to the liquid crystal panel; external electrodes 102b provided on both ends of the lamps 102; common electrodes 103 including a plurality of electrode holders 103a and supplying power to the lamps 102; a first support side 104 disposed on the external electrodes 102b and the common electrodes 103; and a common electrode support 104a extending from the first support side 104 to support the common electrodes 103 and having a heat circulation passage 104b. The LCD further includes a second support side 105 positioned at a lower portion of the external electrodes provided at the plurality of lamps 102 and the common electrodes 103 and fastened to the first support side 104.

The LCD having such a configuration as described above will now be described in detail.

Although not shown, the liquid crystal panel (See 1 in FIG. 1) includes a color filter substrate, an upper substrate, a thin film array (TFT) array substrate, a lower substrate, and a liquid crystal panel formed between the two substrates.

Lamps 102 are provided at a lower side of the liquid crystal panel to provide light to the liquid crystal panel, and in the present invention, the lamps 102 are EEFLs (External Electrode Fluorescent Lamps).

With reference to FIG. 5, each lamp 102 includes a glass tube 102a and external electrodes 102b made of a metal material and provided at both ends of the glass tube 102a.

The glass tube 102a has a tubular shape with both ends hermetically closed, in which a discharge gas such as neon (Ne), argon (Ar), mercury (Hg), or the like, is injected, and a phosphor is coated on an inner wall of the glass tube 102a.

The external electrodes 102b receive power supplied from the common electrodes 103 to form an electric field in the glass tubes 120a, and accordingly, Ne or Ar in the glass tubes 102a is excited to generate electrons. As the electrons collide with Hg within the glass tubes 102a, Hg is restless for a while and then soon stabilized to generate ultraviolet rays. The ultraviolet rays react with the phosphor coated within the glass tubes 102a to generate visible light, allowing the glass tubes 102a, namely, the lamps 102, to emit light.

The lamps 102 are firmly fixed and supported by the electrode holders 103a formed at the common electrodes 103 and receive power from the exterior via the electrode holders 103a. The common electrodes 103 will now be described in detail.

With reference to FIG. 5, the common electrodes 103 include the electrode holders 103a and bar-shaped common units 103b connected with both side ends of the plurality of electrode holders 103a. But the present invention is not limited thereto and the common electrodes may be modified in various manners such that electrode holders may be positioned on the upper surface of the common units.

The electrode holders 103a of the common electrodes 103 are fastened to surround the external electrodes 102b of the lamps 102, whereby the common electrodes 103 firmly fix and support the lamps 102 and electrically connected with the external electrodes 102b of the lamps 102 to commonly supply the same power to the plurality of lamps 102.

The first support side 104 is positioned at an upper portion of the external electrodes 102b of the lamps 102 and the common electrodes 103, and the second support side 105 fastened to the first support side 104 is positioned at a lower portion of the external electrodes 102b of the lamps 102 and the common electrode 103. The first and second support sides 104 and 105 are made of a plastic material.

The first support side 104 includes at least one side and an upper surface, and lamp through holes 104c are formed at the side of the first support side 104 to allow the lamps 102 to pass therethrough. The second support side 105 includes at least one side and a lower surface, and the common electrodes 103 are mounted on the inner lower surface of the second support side 105.

In particular, the common electrode support 104a extends from an inner surface of the first support side 104 and includes a heat circulation passage 104.

The first support side 104 having the common electrode support 104*a* with the heat circulation passage 104*b* will now be described in detail with reference to FIGS. 5 and 6.

Figure 6:
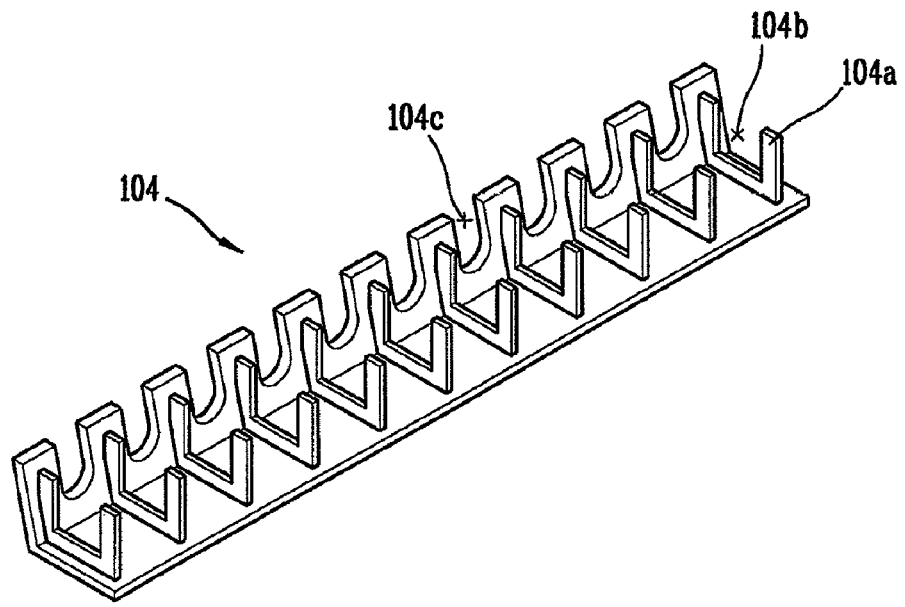
FIG. 6 is a perspective view of the first support of the LCD in FIG. 5.

FIG. 6 shows the first support side 104 in a reversed state, namely, upside down, to facilitate the explanation of the first support side 104.

With reference to FIG. 5, the common electrode support 104*a* of the first support side 104 extends from the inner surface to be in contact with the upper surfaces of the common units 103*b* of the common electrodes 103 to support and fix the common electrodes 103. Here, the area with which the common electrode support 104*a* being in contact with the common units 103*b* of the common electrodes 103 may be designed to form the largest heat circulation passage 104*b* within the range in which the common electrode support 104*a* stably supports the common electrodes 103.

In describing the present invention, the common electrode support 104*a* is integrally formed with the first support side 104, but the present invention is not limited thereto, and the common electrode support 104*a* may be modified in various manners such that the common electrode support is separately formed and fastened to the first support side 104.

With reference to FIGS. 5 and 6, the heat circulation passage 104*b* formed at the common electrode support 104*a* of the first support side 104 is formed as a hole, and in particular, as a rectangular (or square) hole.

The heat circulation passage 104*b* formed at the common electrode support 104*a* of the first support side 104 has the shape of the rectangular or square hole, but the present invention is not limited thereto, and the heat circulation passage 104*b* may have various shapes such as an arch shape, a semicircular shape, or the like, within the scope of the present invention.

The heat circulation passage 104*b* formed at the common electrode support 104*a* of the first support side 104 has the channel ('U') shape as shown in FIG. 6, but the present invention is not limited thereto, and the heat circulation passage 104*b* may have various other shapes such as the shapes of two bars within the range that the heat circulation passage 104*b* stably supports the common electrodes 103. In this case, the two bars would be in contact with the two common units 103*b* of the common electrodes 103, respectively to support the common electrodes 103.

The heat circulation passage 104*b* formed at the common electrode support 104*a* of the first support side 104 may be designed to be as large as possible to allow heat generated from the lamps 102 to smoothly circulate within the first and second support sides 104 and 105 within the range in which the common electrode support 104*a* stably supports the common electrode 103.

As mentioned above, when the LCD having the first support side 104 having the heat circulation passage 104*b* at the common electrode support 104*a* is driven, heat generated from the lamps 102 can smoothly circulate within the first and second support sides 104 and 105 via the heat circulation passage 104*b*.

Figure 7:
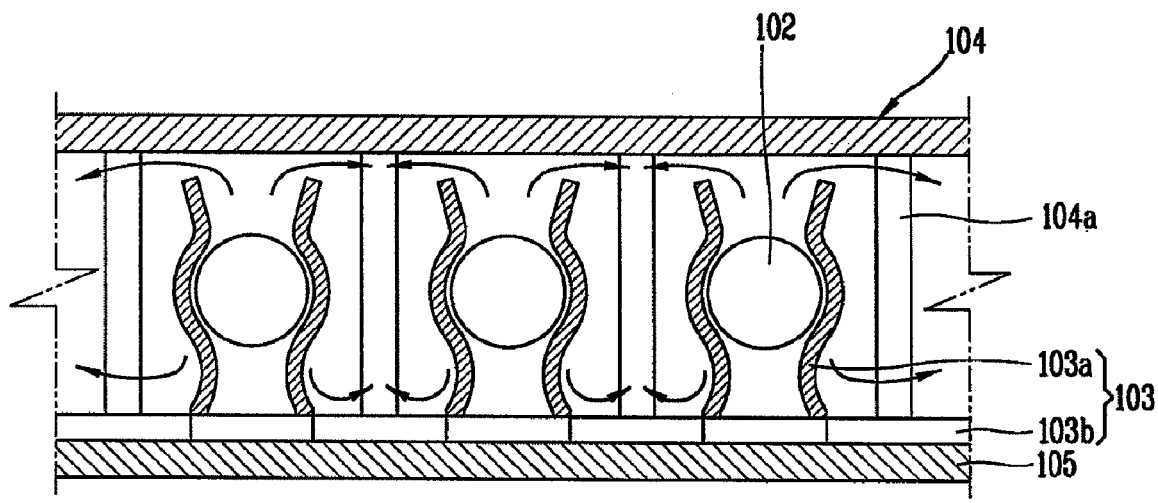
FIG. 7 is a sectional view taken along line VII-VII' in FIG. 5, showing a combined state of first support sides, lamps and common electrodes.

Namely, as shown in FIG. 7, the interior of the first and second support sides 104 and 105 provided in the LCD according to the present invention forms a single space from one end to the other end of the first and second support sides 104 and 105 through the heat circulation passage 104*b*, without forming a barrier, by the common electrode support 104*a*, so that heat generated from the lamp 102 can be smoothly moved within the first and second support sides 104 and 105, thus preventing an increase in the temperature of the LCD.

Thus, when the LCD is driven, expansion of the common electrode 103 made of a metal material and the external electrodes 102*b* of the lamps 102 can by heat can be minimized.

In addition, because expansion of the common electrodes 103 and the external electrodes 102*b* of the lamps 102 is minimized, when power of the LCD is cut off after the LCD is driven for a certain time, contraction of the common electrodes 103 and the external electrodes 102*b* of the lamps can be also minimized.

Accordingly, noise that may be generated due to frictional contacts between the common electrodes 103 and the external electrodes 102*b* of the lamps 102 made of a metallic material and the first and second support sides 104 and 105 made of a plastic material can be minimized.

The effect of the LCD according to the present invention will now be described with reference to FIGS. 4*a*, 4*b*, 8, 9*a* and 9*b*.

Figure 8:
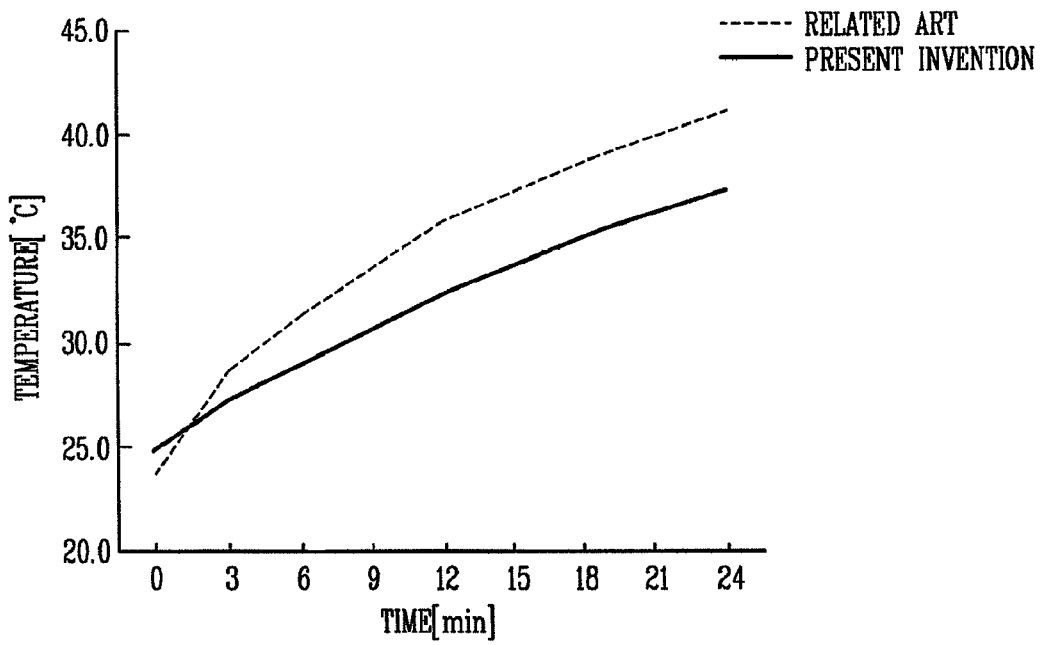
FIG. 8 is a graph showing changes in temperature according to the lapse of time when the LCD is driven according to an embodiment of the present invention.

FIG. 8 is a graph showing changes in the temperature according to the lamps of time when the LCD according to the present invention is driven.

Figure 9A:
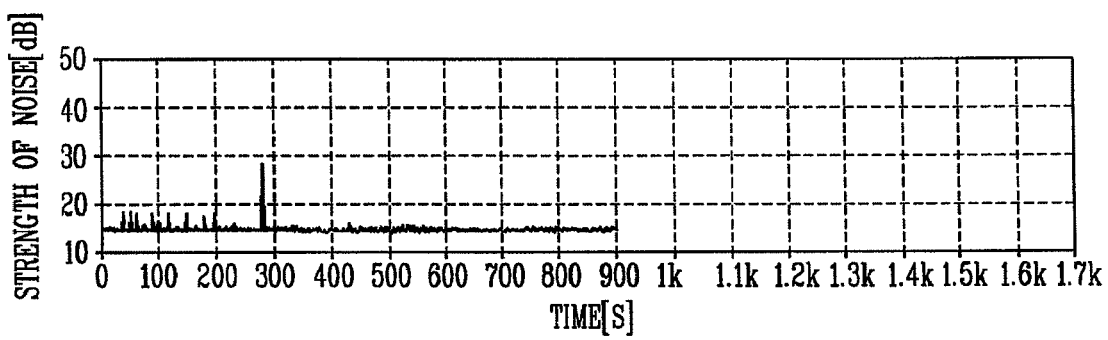
FIGS. 9a and 9b are graphs showing changes in the strength of noise according to the lapse of time when the LCD is driven according to an embodiment of the present invention.
Figure 9B:
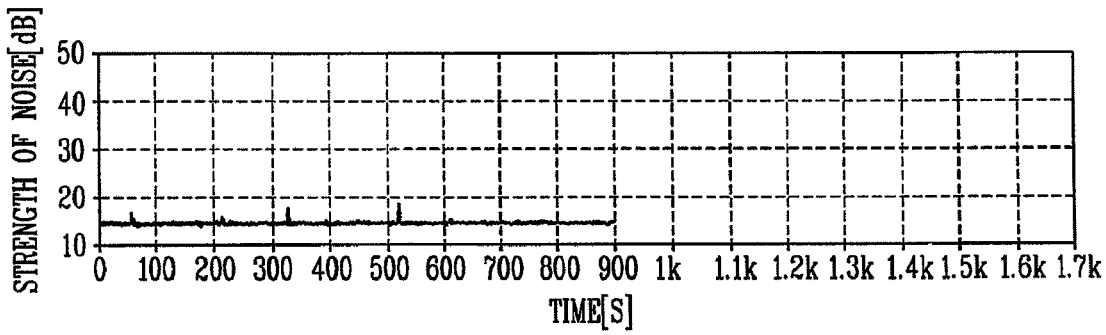

FIG. 9*a* is a graph showing changes in the strength of noise according to the lapse of time based on a driving start time of the LCD when the LCD was driven, and FIG. 9*b* is a graph showing changes in the strength of noise according to the lapse of time based on a power cutoff time of the LCD when power of the LCD was cut off after it was operated for a certain time.

With reference to FIG. 8, the LCD according to the present invention has a smaller temperature variation according to the lapse of time compared with that of the related art LCD.

Figure 4A:
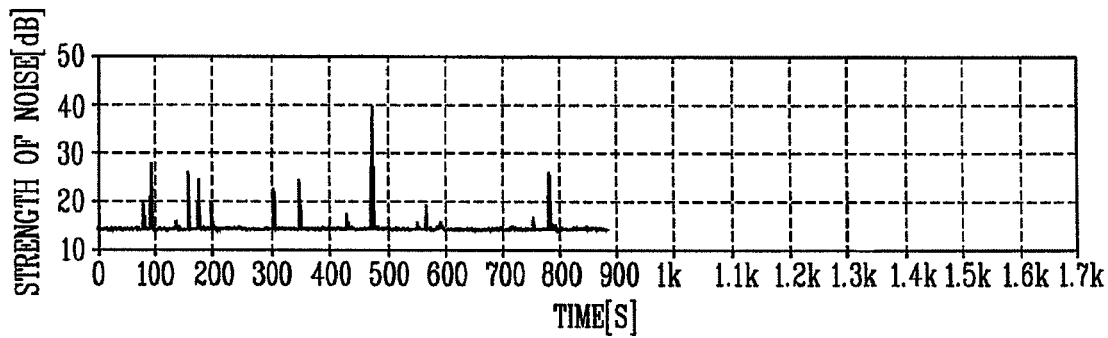
FIGS. 4a and 4b are graphs showing changes in the strength of noise according to the lapse of time when the LCD in FIG. 1 is driven.
Figure 4B:
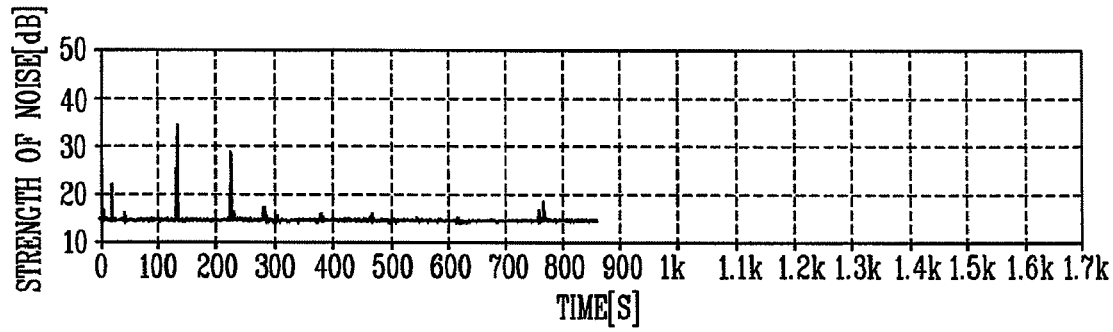

With reference to FIG. 4*a*, when the related art LCD was operated, the detected noise level has a maximum value of about 39.5 [dB], which is a value that was measured at 481 seconds after the start of operation. Also, referring to FIG. 4*b*, when the power of the related art LCD was cut off after the LCD operated for a certain duration, the detected noise level has a maximum value of about 34.5 [dB], which is a value that was measured at 133 seconds after power cut off.

With reference to FIG. 9*a*, when the LCD according to the present invention is operated the detected noise level has a maximum value of about 29.6 [dB], which is a value that was measured at 278 seconds after the start of operation. Also, referring to FIG. 9*b*, when the power of the LCD of the present invention was cut off after the LCD operated for a certain duration, the detected noise level has a maximum value of about 19.5 [dB], which is a value that was measured at 520 seconds after power cut off.

In other words, as shown in the graphs in FIGS. 4*a*, 4*b*, 9*a* and 9*b*, the size of noise generated when the LCD according to the present invention is driven or when power of the LCD according to the present invention is cut off after the LCD is driven for a certain time period is considerably smaller than that of the related art LCD.

Therefore, in the disclosed LCD, because the noise is minimized, unpleasantness to users that may be caused by noise can be also minimized.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
a liquid crystal panel;
a plurality of lamps supplying light to the liquid crystal panel;
external electrodes provided at both ends of the lamps;
common electrodes including a plurality of electrode holders for fixing the external electrodes of the lamps in a surrounding manner and supplying power to the lamps;
a first support side disposed on the external electrodes provided at the plurality of lamps and the common electrodes, wherein the first support side includes at least one side, an upper surface and lamp through holes formed at the side; and
a plurality of common electrode supports extending from the upper surface of the first support side to support the common electrodes and having a heat circulation passage.

2. The device of claim 1, further comprising:
a second support side positioned at a lower portion of the external electrodes provided in the plurality of lamps and the common electrodes and fastened to the first support side.

3. The device of claim 2, wherein the second support side includes at least one side and a lower surface, and the common electrodes are mounted on the inner lower surface of the second support side.

4. The device of claim 1, wherein the common electrodes comprise the electrode holders and one or more bar-shaped common units connected to both ends of the electrode holders, and the common units are in contact with the common electrode support.

5. The device of claim 1, wherein the heat circulation passage of the plurality of common electrode supports is formed as a hole.

6. The device of claim 5, wherein the heat circulation passage is one of a rectangular hole, square hole, or an arch-shaped hole.

* * * * *